United States Patent [19]

Parmeson

[11] 3,789,536
[45] Feb. 5, 1974

[54] ACTIVATOR FOR FISHING LURES

[76] Inventor: Joseph Parmeson, 4821 Linden, Bellaire, Tex. 77401

[22] Filed: Mar. 27, 1972

[21] Appl. No.: 238,106

[52] U.S. Cl. ............................................. 43/42.05
[51] Int. Cl............................................. A01k 85/00
[58] Field of Search . 43/42.05, 42.06, 42.08, 42.09, 43/42.01, 42.12–42.14, 42.2, 43.15, 43.51, 44.83, 44.82, 42.15, 42.74

[56] References Cited
UNITED STATES PATENTS

| 3,529,376 | 9/1970 | Parmeson | 43/42.06 |
| 1,804,391 | 5/1931 | Abrahams | 43/42.2 |
| 1,946,641 | 2/1934 | Sisco | 43/42.12 |
| 1,797,234 | 3/1931 | Jordan | 43/42.2 |

Primary Examiner—Louis G. Mancene
Assistant Examiner—Gregory E. McNeill
Attorney, Agent, or Firm—Jefferson D. Giller; James F. Weiler; Dudley R. Dobie, Jr.

[57] ABSTRACT

An activator to be utilized by fishermen to give lifelike action to fishing lures as they are moved through the water. The activator is freely movable along a leader that is fastened at one end to a swivel and at the other end to a clasp. The activator automatically meshes with the clasp connection of the leader and is comprised of a flat plate, a turning blade assembly formed of or secured to the flat plate, and a leader guide means at at least one end of the plate to receive the leader. In a tackle combination, the swivel is secured not only to the leader but also to a stabilizer which in turn is fastened to a fishing line to prevent twisting of the line.

9 Claims, 5 Drawing Figures

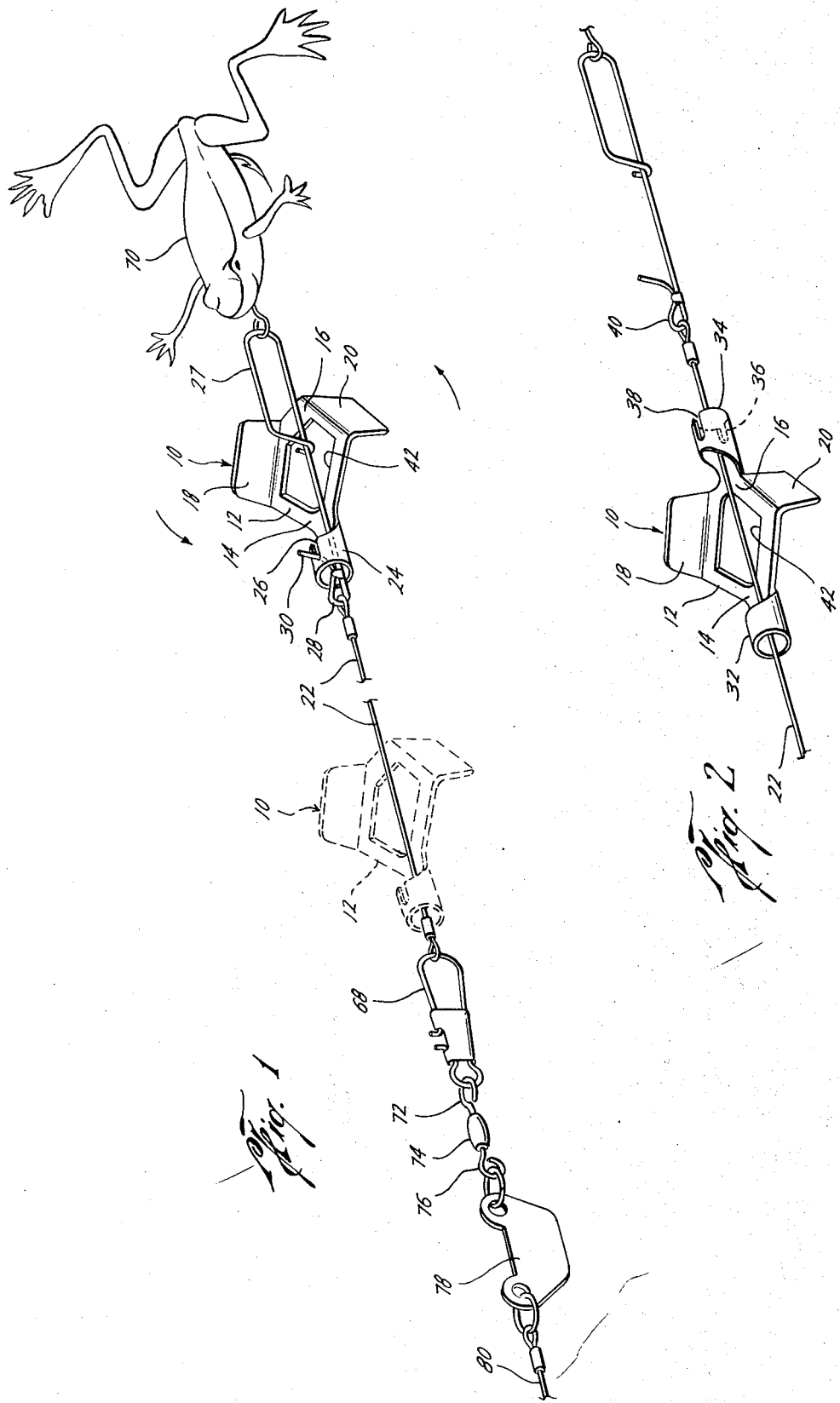

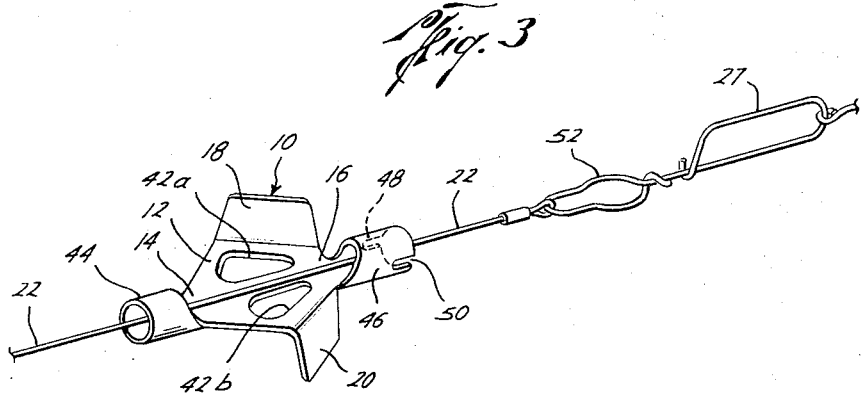
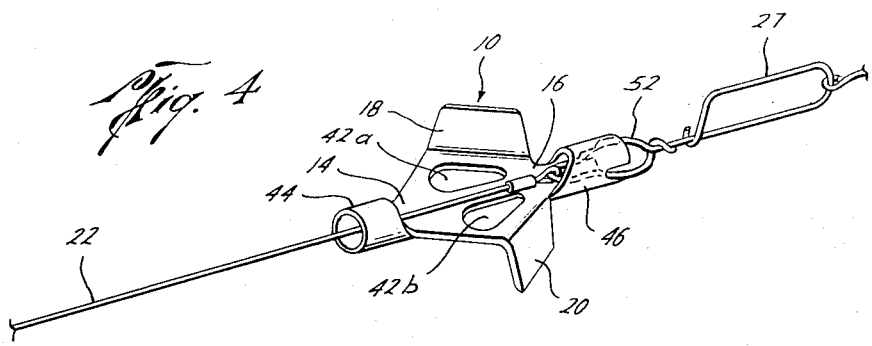
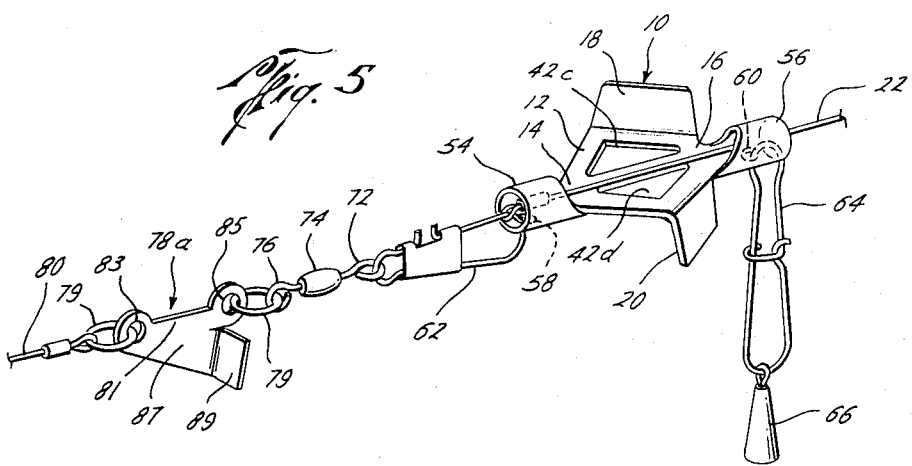

ACTIVATOR FOR FISHING LURES

BACKGROUND OF THE INVENTION

My U. S. Pat. No. 3,529,376 granted Sept. 22, 1970 for "Activator for Fishing Lures" discloses several embodiments of an activator means to give lifelike action to fishing lures as they are moved through water by fishermen. I am aware of other patents relating to fishing apparatus including U.S. Pat. Nos. 1,589,522, 2,577,143, 2,700,843, 2,895,253 and 3,257,750, all of which are directed to various lures and tackle devices intended to attract fish more readily.

As indicated in my above-referenced prior patent, my previous invention relating to activators for fishing lures was directed primarily to an activator acting on a leader which leads to a lure, but not connected to nor necessarily located near the lure itself for the advantages stated in the patent. Nevertheless, in many circumstances, it is desirable to provide an activator near the lure to attract attention of fish. A drawback of this arrangement, however, has been that fish taking the lure might also take the activator possibly resulting in loss or damage to the activator device. Consequently, it would be desirable to provide an activator in close relationship with a lure but movable away from the lure to avoid entanglement with a fish.

In addition, it would be advantageous to provide a freely movable activator for a lure to lessen the possibility of entanglement with weeds, seaweeds or other types of underwater growth as well as debris found in various bodies of water. The present invention provides such advantages.

SUMMARY OF THE INVENTION

The present invention is directed to an activator for fishing tackle to impart erratic, lifelike motion to a lure as it moves through water. The activator of the invention is used with a fishing line, a stabilizer for preventing twisting of the fishing line, a swivel, and a leader with a clasp connected to one end thereof. The activator generally comprises a substantially flat plate having opposed surfaces and a longitudinal axis extending between first and second ends. A turning blade is formed upstanding from each of the plate surfaces and positioned on opposite sides of and at an angle to the longitudinal axis of the plate. In addition, a leader guide means is formed of the plate at at least one of the first and second ends thereof for the leader to extend through freely. One of the leader guide means is provided with at least one longitudinal slot for disengageable meshing with the clasp connection of the leader. Upon engagement or meshing of the activator with the clasp connection of the leader, erratic motion is imparted to the lure when the fishing line is pulled through the water. When the pulling or retrieving action ceases, the activator automatically disengages from the lure connection of the leader whereby the activator moves away from the clasp and out of contact with the fish.

The activator may be provided with either one or two leader guide means, a single guide means being preferable when reduced weight is desired for fishing closer to the surface of a body of water. In a further embodiment, an opening is provided near at least one of the first or second ends of the plate in order that the activator may be connected directly to a swivel or so that a weight may be connected to the activator to provide better control when casting the tackle for example under windy conditions as well as assisting in sinking the activator when fishing in deeper water.

It is, therefore, an object of the prevent invention to provide a fishing lure activator which may disengageably mesh automatically with the lure connection of a leader so as to attract fish to the lure yet disengage automatically upon a strike by a fish so that the activator is not taken by the fish.

Another object of the present invention is to provide an activator device that is freely movable along a leader yet imparts erratic or rotative motion to a lure upon engagement with the lure connection while providing protection against entanglement of the leader in weeds, debris and the like.

A still further object of the present invention is to provide such an activator freely movable along a leader yet connectible to a swivel away from the lure to nevertheless provide erratic or rotative movement of the lure when desired.

A still further object of the present invention is the provision of an activator device for use with fishing tackle which movably engages a leader so as to mesh with the lure connection thereof when desired to impart erratic or rotative movement to the lure for use in either shallow or deep water fishing.

Yet a further object of the present invention is the provision of a fishing tackle activator comprising a substantially flat plate with turning blades upstanding from the surfaces of the plate and leader guide means formed of the plate for a leader to freely extend through so as to engage a lure connection and impart lifelike movement to the lure.

A still further object of the present invention is the provision of such an activator for use with a fishing line, a stabilizer means for preventing twisting of the fishing line, a swivel, and a leader with a clasp connected to one end thereof.

Other and further objects, features and advantages will be apparent from the following description of the presently preferred embodiment of the invention, given for the purpose of disclosure and taken in conjunction with the accompanying drawings.

DESCRIPTION OF THE DRAWINGS

In the drawings forming a part of the disclosure herein, like character references designate like parts through the several views which are as follows:

FIG. 1 is a perspective view of fishing tackle according to the present invention showing an activator engaged with the lure connection of a leader and further showing the activator in outline form in disengagement from said connection;

FIG. 2 is a partial view similar to that of FIG. 1 except showing a different embodiment of the activator having two leader guides;

FIG. 3 is yet another view of the activator device of the present invention with two leader guides, one guide member having dual slots for engagement with the lure connection of the leader;

FIG. 4 is similar to FIG. 3 except that the activator is shown in engagement with the lure connection of the leader; and FIG. 5 illustrates an activator according to the present invention having openings near both ends for connection to a swivel as well as a sinker or weight.

DESCRIPTION OF THE PREFERRED EMBODIMENTS

With reference to FIGS. 1-5, the activator device 10 of the present invention includes a substantially flat plate 12 having opposed surfaces and a longitudinal axis extending between first and second ends 14 and 16 respectively. Formed of or otherwise secured to the flat plate 12 are turning blades 18 and 20 upstanding from each of the opposed surfaces of the plate 12 and positioned on opposite sides of and at an angle to the longitudinal axis of the plate 12 so as to converge toward the second end 16 of the plate.

A leader guide means is formed of the plate 12 at at least one of the first and second ends 14 and 16 thereof for a leader 22 to freely extend through. With respect to the embodiment of FIG. 1, the leader guide means is generally a cylindrical member 24 through which extends the leader 22. The leader guide 24 is provided with one longitudinal slot 26 for disengageably meshing with the lure connection 28 of the leader and more specifically for meshing with an extended portion 30 of the clasp 27 which forms the lure connection means 28 as shown in FIG. 1.

With reference to FIG. 2, the activator 10 shown is provided with a leader guide means formed of or otherwise secured to each of the first and second ends 14 and 16 of the plate 12. Thus provided are leader guides 32 and 34 for the leader 22 to extend through for guided movement of the activator 10 along the leader. The second leader guide 34 is provided with longitudinal slots 36 and 38 for disengageable meshing with the lure connection 40 of the leader in a manner similar to that explained with respect to FIG. 1.

With respect to each of the embodiments of the activator 10 shown in FIGS. 1 and 2, it will be noted that a port 42 is formed in the plate 12 in order to decrease resistance of water to rotation of the activator 10 when pulled through the water to impart rotative or erratic movement to the bait or lure connected to the clasp 27 which in turn is connected to the leader 22. Furthermore, the size of the opening 42 may be varied depending on weight of the activator desired. For example, a larger port 42 decreases weight of the activator 10 enabling the activator and tackle to assume more buoyant properties for purposes of fishing in shallow water or near the surface of a body of water. Conversely, a smaller port 42 in the activator 10 increases weight of the activator for purposes of fishing in deeper water or further below the surface of a body of water.

Turning to FIGS. 3 and 4, a still further embodiment of the activator 10 is shown having leader guides 44 and 46 at the first and second ends 14 and 16, respectively, of the plate 12. In this embodiment, however, the second leader guide 46 is provided with two longitudinal slots 48 and 50 for purposes of disengageably meshing with a ring-type clasp 52 forming a lure connection for the laader 22. The activator 10 is shown in meshing engagement with the ring clasp 52 in FIG. 4 and in disengagement in FIG. 3.

Further with respect to FIGS. 3 and 4, ports 42a and 42b are formed in the plate 12 of the activator 10 to decrease resistance of water to the rotation of the activator. These ports provide less open area than the ports 42 of the embodiment shown in FIGS. 1 and 2. Consequently, the activator of FIGS. 3 and 4 is heavier and is more suitable for fishing in deeper water or further below the surface than is the case with respect to the activators of FIGS. 1 and 2.

With regard to FIG. 5, the activator 10 illustrated is similar to the previously discussed embodiments in that it is provided with a flat plate 12 and turning blades 18 and 20. However, the leader guides 54 and 56 at the first and second ends 14 and 16 of the plate 12 are provided with openings or holes 58 and 60, respectively, near the ends of the plate 12. The opening 58 enables the connection of a clasp 62 to the first end 14 of the activator 10, the clasp 62 also engaging one end of the leader 22. Thus, in this embodiment, the opening 58 is, in effect, a closed slot in the leader guide 54 forming an opening for connection of the activator 10 to either the leader 22 of the clasp 62 which in turn is connected to a swivel.

Continuing with respect to FIG. 5, the opening 60 near the second end of 16 of the plate 12 conveniently accommodates attachment of another clasp 64 in turn connected to a weight or sinker 66. The added weight of the sinker 66 together with the relatively small ports 42c and 42d of the plate 12 add weight to the activator 10 to facilitate fishing in deeper water.

Further with respect to FIG. 5, a stabilizer 78a is shown attached by means of split rings 79 to the fishing line 80 and the first segment 76 of the swivel 74. The stabilizer 78a has an elongate body portion 81 with eyelets 83 and 85 at either end for connection to the split rings 79. A first blade 87 is integrally formed of and disposed substantially parallel to the body portion 81. A second blade 89 is integrally formed of the first blade 87 and projects from and is disposed at an angle to the first blade. Preferably, the first and second blades 87 and 89 are formed below the eyelets 83 and 85 for gravity effect as shown in the drawing.

The stabilizer 78a has unique advantages relative to other stabilizer devices in that it may be made small in size so as to not attract fish. The stabilizer is simple and economical to manufacture and is readily attachable to any swivel by means such as the split rings 79 engaging the eyelets 83 and 85. In use, the shorter second blade 89 meets with water resistance to prevent the stabilizer from revolving when the activator 10 is rotating. Thus the stabilizer 78a prevents the line 80 from twisting. On the other hand, the longer first blade 87 of the stabilizer has a leverage advantage over the second blade 89 to keep the stabilizer in alignment with the swivel 74, the activator 10 and the line 80. In other words, the first blade 87 of the stabilizer 78a keeps the stabilizer from "fishtailing" that would otherwise occur by action of the second blade 89. Preferably the first blade 87 is at least three times as long as the second blade 89 to effect this leverage function.

In operation and with respect particularly to FIG. 1, a leader 22 is passed through the leader guide 24 of the activator 10 and is connected at one end to a lure clasp 27 and at the other end to a swivel clasp 68. A lure or bait 70 is attached to the lure clasp 27 while the swivel clasp 68 is connected to the second segment 72 of a swivel 74. The first segment 76 of the swivel is connected to a stabilizing means or blade 78 which in turn is connected to a fishing line 80. The swivel 74 is of a conventional type wherein the first and second sgements 76 and 72, respectively, are rotatable relative to each other. The stabilizer blade 78 is provided to counteract torque imparted to the swivel 74 by the activator 10 so as to prevent twisting of the line 80.

When the assembly shown in FIG. 1 is operably attached to a pole or rod, the assembly may be cast into the water. During both the casting and retrieval of the assembly, the activator 10 in FIG. 1 moves into the position shown for automatic meshing with the lure connection 28 of the leader 22. By virtue of the longitudinal slot 26 contacting the extended portion 30 of the lure connection 28, rotative movement of the turning blades 18 and 20 as indicated by the heavy arrows is imparted to the lure clasp 27 and in turn to the lure 70 to create an erratic, wobbly, or life-like movement to the lure. When a fish strikes or otherwise takes the lure 70, interruption of forward movement of the tackle apparatus shown in FIG. 1 causes the activator 10 to disengage from the lure connection 28 of the leader and move, for example, into the position shown in dotted outline. Advantageously, the activator 10 moves away from the caught fish to greatly reduce the likelihood of damage to or loss of the activator. In addition, it will be recognized that movability of the activator 10 as described greatly diminishes the possibility of entanglement with weeds or underwater debris which otherwise is a continual problem for fishermen.

With respect to FIGS. 2–4, operation of the activator 10 is similar to that described with respect to FIG. 1 except that the provision of dual leader guide means in many instances will promote a more positive turning action by the activator 10 which is particularly useful when using larger hooks, more rigid lures or heavier leaders. The dual leader guide means is also advantageous when using long, soft, simulated natural bait lures such as long worms, eels, pork rind strips, lizards, etc. Consequently, the dual leader guide means enables the use of more hooks on lures or the spacing of hooks along the lures to increase the possibility of hooking a fish striking at any point along the length of the lure without sacrificing the loss of effectiveness in motion imparted to the lure by the activator.

Finally, the activator embodiment shown in FIG. 5 is connected directly to the second segment 72 of the swivel 74 by means of the clasp 62. Since the leader 22 is likewise connected to the clasp 62, rotative motion of the activator 10 is imparted directly to the leader 22 which in turn imparts rotative movement to a lure attached to the leader.

The advantages of the activator embodiments of the present invention will now be apparent. The activator device embodying disengageable meshing of the activator with the clasp connection of the leader provides a self-locking and self-releasing action with the attendant advantages mentioned. The activator may easily be fabricated from either thin sheet metal or plastic material and hence is susceptible of being made of differing weights for varying fishing conditions. The device is easily assembled with the necessary fishing tackle and may easily be transferred from one tackle assembly to another.

The present invention, therefore, is well adapted to carry out the objects and attain the ends and advantages mentioned, as well as others inherent therein. While presently preferred embodiments of the invention have been given for the prupose of disclosure, numerous changes in the details of construction, the combination, shape, size and arrangement of parts may be resorted to without departing from the spirit and scope of the invention.

What is claimed is:

1. An activator for use with a fishing line, stabilizer means for preventing twisting of the fishing line, a swivel and a leader with a clasp connected to one end thereof, said activator comprising,
   a. a substantially flat plate having opposed surfaces and a longitudinal axis extending between first and second ends,
   b. a turning blade upstanding from each of said surfaces of the plate (a) and positioned on opposite sides of and at an angle to, the longitudinal axis so as to converge toward the second end of the plate, and
   c. a leader guide means formed of the plate (a) at at least one of the first and second ends thereof for the leader to freely extend through, one leader guide means having at least one longitudinal slot for automatic meshing and self-releasing coaction of said guide means with the clasp connection of the leader.

2. The activator of claim 1 wherein the leader guide means (c) is formed at end of the first and second ends of the plate (a), one of the leader guide means having at least one longitudinal slot for automatic meshing and self-releasing coaction of said guide means with the clasp connection of the leader.

3. The activator of claim 1 wherein the leader guide means (c) is formed at only one of the ends of the plate (a) and has at least one longitudinal slot for automatic meshing and self-releasing coaction of said guide means with the clasp connection of the leader.

4. The invention of claim 1 including additionally at least one port formed in the plate (a) to decrease resistance of water to the rotation thereof.

5. A fishing tackle apparatus including,
   a. a fishing line,
   b. a stabilizer means secured to the line (a) for preventing twisting of the line,
   c. a swivel having first and second segments rotatable relative to each other, the first segment being connected to the stabilizer means (b),
   d. a leader connected to the second segment of the swivel and in turn connected to a clasp, and
   e. an activator comprising,
      i. a substantially flat plate having opposed surfaces and a longitudinal axis extending between first and second ends,
      ii. a turning blade upstanding from each of said surfaces of the plate (i) and positioned on opposite sides of and at an angle to the longitudinal axis so as to converge toward the second end of the plate, and
      iii. a leader guide means formed of the plate (i) at at least one of the first and second ends thereof for the leader to freely extend through, one leader guide means having at lease one longitudinal slot for automatic meashing and self-releasing coaction of said guide means with the clasp connection of the leader (d).

6. The activator of claim 5 wherein the leader guide means (iii) is formed at each of the first and second ends of the plate (i), one of the leader guide means having at least one longitudinal slot for automatic meashing and self-releasing coaction of said guide means with the clasp connection of the leader (d).

7. The activator of claim 5 wherein the leader guide means (iii) is formed at only one of the ends of the plate (i) and has at least one longitudinal slot for automatic meshing and self-releasing coaction of said guide means with the clasp connection of the leader (d).

8. The invention of claim 5 including additionally at least one port formed in the plate (i) to decrease resistance of water to the rotation thereof.

9. A stabilizer for use with a fishing tackle apparatus to prevent twisting of a fishing line, including,
   a. an elongate body portion having eyelets at either end for connection to the fishing tackle,
   b. a first blade integrally formed of and disposed substantially parallel to the body portion, and
   c. a second blade integrally formed of the first blade and projecting from and disposed at an angle to said first blade, the first and second blades being disposed on the same side of the eyelets of the elongate body portion and the first blade being at least three times as long as the second blade.

* * * * *